(12) United States Patent
Costa (10) Patent No.: US 10,705,562 B2
(45) Date of Patent: Jul. 7, 2020

(54) TRANSITIONING BETWEEN MODES OF INPUT

(71) Applicant: Apple Inc., Cupertino, CA (US)

(72) Inventor: Paul Costa, Sunnyvale, CA (US)

(73) Assignee: Apple Inc., Cupertino, CA (US)

( * ) Notice: Subject to any disclaimer, the term of this patent is extended or adjusted under 35 U.S.C. 154(b) by 15 days.

(21) Appl. No.: 16/029,428

(22) Filed: Jul. 6, 2018

(65) Prior Publication Data

US 2018/0314291 A1    Nov. 1, 2018

Related U.S. Application Data

(63) Continuation of application No. 12/171,147, filed on Jul. 10, 2008, now Pat. No. 10,031,549.

(51) Int. Cl.
*G06F 3/041* (2006.01)
*G06F 1/16* (2006.01)
*G06F 3/0488* (2013.01)

(52) U.S. Cl.
CPC .......... *G06F 1/1601* (2013.01); *G06F 1/1616* (2013.01); *G06F 1/1643* (2013.01); *G06F 1/1677* (2013.01); *G06F 3/0488* (2013.01); *G06F 3/041* (2013.01); *G06F 2200/1631* (2013.01); *G06F 2200/1637* (2013.01); *G06F 2203/0381* (2013.01); *G09G 2340/0407* (2013.01); *G09G 2340/0464* (2013.01)

(58) Field of Classification Search
CPC combination set(s) only.
See application file for complete search history.

(56) References Cited

U.S. PATENT DOCUMENTS

| 5,483,261 A | 1/1996 | Yasutake |
| 5,488,204 A | 1/1996 | Mead et al. |

(Continued)

FOREIGN PATENT DOCUMENTS

| JP | 2000-163031 A | 6/2000 |
| JP | 2002-342033 A | 11/2002 |
| WO | WO-2010/006210 A1 | 1/2010 |

OTHER PUBLICATIONS

Final Office Action dated Oct. 26, 2012, for U.S. Appl. No. 12/171,147, filed Jul. 10, 2008, 15 pages.

(Continued)

*Primary Examiner* — Temesghen Ghebretinsae
*Assistant Examiner* — Sosina Abebe
(74) *Attorney, Agent, or Firm* — Kubota & Basol LLP (57) ABSTRACT

Transitioning between a high-resolution input mode, such as a mouse-based interface, and a low-resolution input mode, such as a touch-based interface, is described. A change of orientation of a touch screen between a first orientation and a second orientation is detected. Transitioning between the two input modes and corresponding user interfaces (UIs) is based on the detected change of orientation. A change of orientation can be detected with one or more sensors, such as an accelerometer, position sensors, etc. Transitioning from one mode to another can include modifying an item displayed in the UI of the one mode into a corresponding item displayed in the UI of the other mode. The modifying can include enlarging/reducing, obscuring/unobscuring, moving, etc. For example, an item can be obscured by the visual effect of sliding it off of the screen.

30 Claims, 7 Drawing Sheets

(56) References Cited

U.S. PATENT DOCUMENTS

| | | | |
|---|---|---|---|
| 5,766,493 | A | 6/1998 | Shin |
| 5,816,225 | A | 10/1998 | Koch et al. |
| 5,825,352 | A | 10/1998 | Bisset et al. |
| 5,835,079 | A | 11/1998 | Shieh |
| 5,880,411 | A | 3/1999 | Gillespie et al. |
| 6,121,690 | A | 9/2000 | Yamada et al. |
| 6,121,960 | A | 9/2000 | Carroll et al. |
| 6,188,391 | B1 | 2/2001 | Seely et al. |
| 6,266,236 | B1* | 7/2001 | Ku ................. G06F 1/162 312/223.1 |
| 6,310,610 | B1 | 10/2001 | Beaton et al. |
| 6,323,846 | B1 | 11/2001 | Westerman et al. |
| 6,327,011 | B2 | 12/2001 | Kim |
| 6,690,387 | B2 | 2/2004 | Zimmerman et al. |
| 6,980,423 | B2* | 12/2005 | Tanaka ............. G06F 1/162 248/917 |
| 7,015,894 | B2 | 3/2006 | Morohoshi |
| 7,164,432 | B1 | 1/2007 | Amemiya |
| 7,184,064 | B2 | 2/2007 | Zimmerman et al. |
| 7,663,607 | B2 | 2/2010 | Hotelling et al. |
| 8,479,122 | B2 | 7/2013 | Hotelling et al. |
| 2003/0080949 | A1 | 5/2003 | Ditzik |
| 2003/0160824 | A1* | 8/2003 | Szumla ............. G06T 11/60 715/769 |
| 2004/0017375 | A1* | 1/2004 | Lui ................. G06F 3/0488 345/581 |
| 2004/0039862 | A1 | 2/2004 | Hunt et al. |
| 2004/0051700 | A1 | 3/2004 | Pensjo |
| 2005/0104857 | A1 | 5/2005 | Jacobs et al. |
| 2005/0121594 | A1 | 6/2005 | Kuo |
| 2006/0017692 | A1 | 1/2006 | Wehrenberg et al. |
| 2006/0026521 | A1 | 2/2006 | Hotelling et al. |
| 2006/0077622 | A1* | 4/2006 | Keely ............. G06F 1/1616 361/679.09 |
| 2006/0097991 | A1 | 5/2006 | Hotelling et al. |
| 2006/0101354 | A1* | 5/2006 | Hashimoto ....... G06F 3/0488 715/863 |
| 2006/0129951 | A1 | 6/2006 | Vaananen et al. |
| 2006/0197753 | A1 | 9/2006 | Hotelling |
| 2006/0209016 | A1 | 9/2006 | Fox et al. |
| 2006/0214910 | A1 | 9/2006 | Mizuno et al. |
| 2008/0059888 | A1 | 3/2008 | Dunko |
| 2008/0094371 | A1* | 4/2008 | Forstall ........... G06F 3/04883 345/173 |
| 2008/0109751 | A1* | 5/2008 | Fitzmaurice ....... G06F 3/0488 715/793 |
| 2008/0231763 | A1 | 9/2008 | Estevez et al. |
| 2008/0259094 | A1 | 10/2008 | Kim et al. |
| 2009/0172597 | A1* | 7/2009 | Mercer ............. G06F 3/0488 715/840 |
| 2009/0244832 | A1* | 10/2009 | Behar ............. G06F 1/162 361/679.55 |
| 2009/0300537 | A1 | 12/2009 | Park |
| 2010/0007613 | A1 | 1/2010 | Costa |

OTHER PUBLICATIONS

Final Office Action dated Sep. 6, 2017, for U.S. Appl. No. 12/171,147, filed Jul. 10, 2008, 21 pages.

International Search Report dated Oct. 6, 2010, for PCT Application No. PCT/US2009/050168, filed Jul. 9, 2009, four pages.

Lee, S.K. et al. (Apr. 1985). "A Multi-Touch Three Dimensional Touch-Sensitive Tablet," *Proceedings of CHI: ACM Conference on Human Factors in Computing Systems*, pp. 21-25.

Non-Final Office Action dated Mar. 15, 2012, for U.S. Appl. No. 12/171,147, filed Jul. 10, 2008, 14 pages.

Non-Final Office Action dated Mar. 24, 2016, for U.S. Appl. No. 12/171,147, filed Jul. 10, 2008, 18 pages.

Non-Final Office Action dated Jan. 3, 2017, for U.S. Appl. No. 12/171,147, filed Jul. 10, 2008, 18 pages.

Notice of Allowance dated Mar. 22, 2018, for U.S. Appl. No. 12/171,147, filed Jul. 10, 2008, 16 pages.

Rubine, D.H. (Dec. 1991). "The Automatic Recognition of Gestures," CMU-CS-91-202, Submitted in Partial Fulfillment of the Requirements for the Degree of Doctor of Philosophy in Computer Science at Carnegie Mellon University, 285 pages.

Rubine, D.H. (May 1992). "Combining Gestures and Direct Manipulation," CHI '92, pp. 659-660.

Westerman, W. (Spring 1999). "Hand Tracking, Finger Identification, and Chordic Manipulation on a Multi-Touch Surface," A Dissertation Submitted to the Faculty of the University of Delaware in Partial Fulfillment of the Requirements for the Degree of Doctor of Philosophy in Electrical Engineering, 364 pages.

Examiner's Answer to Appeal Brief received for U.S. Appl. No. 12/171,147, dated Sep. 4, 2013, 6 pages.

Patent Board Decision received for U.S. Appl. No. 12/171,147, dated Nov. 27, 2015, 7 pages.

* cited by examiner

TRANSITIONING BETWEEN MODES OF INPUT

CROSS-REFERENCE TO RELATED APPLICATIONS

This application is a continuation of U.S. patent application Ser. No. 12/171,147, filed Jul. 10, 2008 and published on Jan. 14, 2010 as U.S. Patent Publication No. 2010-0007613, the content of which is incorporated herein by reference in its entirety for all purposes.

FIELD OF THE INVENTION

This relates generally to transitioning between modes of input, and more particularly, to transitioning between a user interface (UI) for a high-resolution input mode and a UI for a low-resolution input mode.

BACKGROUND OF THE INVENTION

Many types of input devices are presently available for performing operations in a computing system, such as buttons or keys, mice, trackballs, joysticks, touch sensor panels, touch screens and the like. Touch screens, in particular, are becoming increasingly popular because of their ease and versatility of operation as well as their declining price. Touch screens can include a touch sensor panel, which can be a clear panel with a touch-sensitive surface, and a display device such as a liquid crystal display (LCD) that can be positioned partially or fully behind the panel so that the touch-sensitive surface can cover at least a portion of the viewable area of the display device. Touch screens can allow a user to perform various functions by touching the touch sensor panel using a finger, stylus or other object at a location dictated by a user interface (UI) being displayed by the display device. In general, touch screens can recognize a touch event and the position of the touch event on the touch sensor panel, and the computing system can then interpret the touch event in accordance with the display appearing at the time of the touch event, and thereafter can perform one or more actions based on the touch event.

While touch-based input is well-suited to many applications, conventional styles of input, such as mouse/keyboard-based input, may be preferred in other applications. Therefore, it may be desirable for some devices to provide for touch-based input as well as mouse/keyboard-based input. However, a UI being displayed by the display device during a touch-based input mode might not be suited for use during a mouse/keyboard-based input mode, and vice versa.

SUMMARY OF THE INVENTION

The foregoing can be addressed by providing transitioning between modes of input, for example, transitioning between touch-based input and mouse/keyboard-based input, by sensing a change in the orientation of a touch screen display. The change in the orientation of the display can be detected by one or more sensors. For example, an accelerometer in the display can sense the force of gravity along an axis, and the measured force can be used to determine an angle of the display with respect to the ground (i.e., the plane perpendicular to the direction of the force of gravity). A transition between input modes can be performed when the orientation of the display crosses a predetermined threshold, such as when the vertical angle (tilt) of the display crosses a predetermined angle. In another example, a rotation sensor can be mounted in an adjustable stand of the display. The rotation sensor can measure a rotation position of the stand, such as an angle between the base of the stand and a hinged arm that connects the base and the display. The measured rotation position can be used to determine the orientation of the display. In another example, the display can include touch sensor areas located where a user typically grasps the display to change the display's orientation. In this case, detection of touch in these areas could be used in addition to orientation information from one or more other sensors, such as accelerometers, position sensors, etc., to aid in the detection of a change in orientation of the display. As one skilled in the art would understand in light of the present description, other types of sensors may be used, and different types of sensors may be used in combination, to sense the orientation of the display.

The change in the orientation of the display can be detected, for example, by a processor based on sensor data received from the sensor(s). When the processor determines that the orientation of the display has crossed a predetermined threshold, e.g., the orientation of the display has changed from a touch input mode to a keyboard/mouse input mode, or vice versa, the processor can activate a transition process. In one example transition from a high-resolution input mode UI to a low-resolution input mode UI, certain items displayed in the high-resolution input mode UI can appear to "slide off" the edges of the display screen. For example, a menu bar and menu bar items, a dock and dock items, directory items, scrollbars, and the mouse pointer may appear to move towards the closest edge of the screen and continue to move off of the screen until they disappear from view, such that they are not displayed in the low-resolution input mode UI. Other items displayed in the high-resolution input mode UI may appear to increase in size, for example, the display may appear to zoom-in, such that the items are displayed at a larger size in the low-resolution input mode UI. In this example, the visual effect can be understood by envisioning that the user is viewing the screen through a pinhole. As the display screen is moved towards the user, which would be the typical motion when the user wants to transition from a mouse-based input to a touch-based input, the edges of the pinhole are obscuring the outer portions of the display screen, such that items at the outer edge of the screen appear to be moving outward and off the edge of the screen, or being pushed or slid off, as the view is essentially zooming-in to the center portion of the screen. In order to transition from the low-resolution input mode UI to the high-resolution input mode UI, the transition effect can, for example, simply be reversed.

In one example feature, a view of items that have "slid off" the screen can be regained (the items are retrievable). If the user would like to view items that have been slid off the screen, the user can use a touch input, for example, the user can place his or her hand (or one or more fingers) on the screen and move the hand or fingers in a direction such that the items appear to be "pulled back" onto the screen and are un-obscured.

The transition effect may be implemented in different ways including, for example, items may be slid off the screen in any direction, at any speed, etc., portions of certain "obscured" items may remain displayed on the screen, items remaining on the screen may be enlarged by the same fixed percentage, by different percentages, and/or some not enlarged at all, and the relative positions and/or appearance of some or all of the items remaining on the screen may be changed or modified in ways other than an increase in size.

DETAILED DESCRIPTION OF THE PREFERRED EMBODIMENTS

In the following description of preferred embodiments, reference is made to the accompanying drawings which form a part hereof, and in which it is shown by way of illustration specific embodiments in which the invention can be practiced. It is to be understood that other embodiments can be used and structural changes can be made without departing from the scope of the embodiments of this invention.

This relates to transitioning between modes of input, and in particular, transitioning between touch-based input and mouse/keyboard-based input, by sensing a change in the orientation of a display screen. For example, when a display screen is oriented upright and relatively far from a user in a configuration typical of mouse and keyboard input, a mouse/keyboard-based input mode can be selected and a corresponding UI can be displayed on the screen. In this input mode, the mouse and keyboard are typically oriented closer to the user and relatively flat (i.e., substantially parallel to the ground or a work surface such as a desktop). To switch to a touch-based input, a user may wish to change the orientation of the display screen to make touching the screen easier or more natural. For example, to enter touch input the user might want to pull the screen closer and push the display screen down flat, as if the screen is a book the user is reading. Therefore, when the display screen is oriented closer to the user and relatively low and flat (i.e., substantially parallel to the ground or work surface such as a desktop), a touch-based input mode can be selected and a corresponding UI can be displayed. In this way, for example, transitions from one input mode to another may be made with minimal or no user input and may appear more seamless to the user.

Because of differences between modes of input, it can be difficult to transition from one input mode to another efficiently. In general, input interfaces may be roughly classified into two categories, high-resolution input methods and low-resolution input methods. Note that high/low-resolution input should not be confused with high/low resolution display. The latter refers to the level of fineness (resolution) at which an image can be displayed; the former refers to the general level of fineness (resolution) at which user input can be detected and processed. One measure of input resolution may be based on, for example, the size of selectable icons, buttons, sliders, and other input items and/or the distance between input items that an input method requires for reliable detection of an input. For example, a high-resolution input method may be able to discern whether a user is selecting one or the other of two very small icons that are displayed close to each other, while a low-resolution input method may not be able to determine which of the two icons the user is trying to select. In this regard, input methods based on a computer mouse typically are relatively high-resolution input methods. In particular, a mouse input method can allow selection of very small input items that are very close together, in some cases allowing selection of a single-pixel-sized input item on a display screen. Because small input items can be selected and/or manipulated, input items displayed in a UI for a mouse-based input mode can include small control objects, such as small buttons. Of course, a UI for a high-resolution input method need not utilize small and/or closely-spaced input items, but may use larger and/or further-apart input items. By comparison, input methods based on touching a display screen with a finger or thumb, for example, are relatively low-resolution input methods because they typically require the use of input items that are larger and/or further apart. As described in more detail below, it can be beneficial to take into account some of the differences between low-resolution input and high-resolution input in making transitions between the two modes of input.

Figure 1:
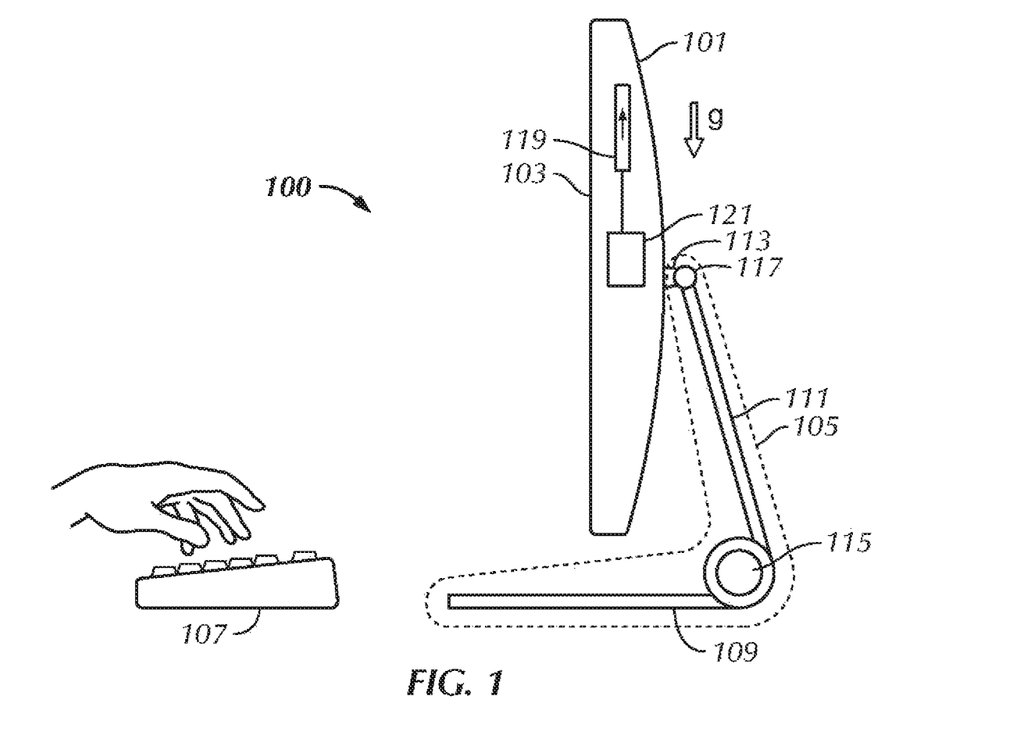
FIG. 1 illustrates an example system for transitioning between a high-resolution input mode and a low-resolution input mode according to embodiments of the invention, the system shown oriented for the high-resolution input mode.
Figure 2:
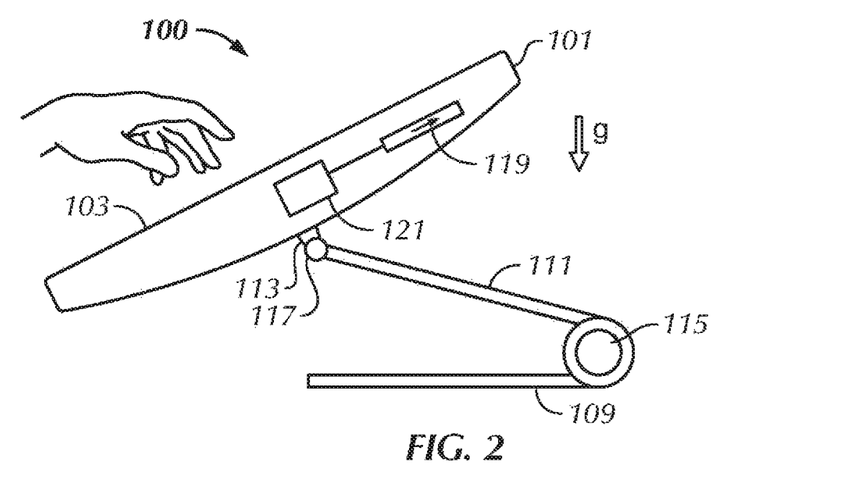
FIG. 2 illustrates the example system of FIG. 1, the system shown oriented for the low-resolution input mode.

An example system for transitioning between a high-resolution input mode and a low-resolution input mode according to embodiments of the invention will now be described with reference to FIGS. 1 and 2. FIGS. 1 and 2 show a computer system 100 including a housing 101, display screen 103, an adjustable stand 105, and a keyboard 107. Adjustable stand 105 includes a lower base 109, an arm 111, an attachment post 113, a base hinge 115, and a post hinge 117. Included within housing 101 are an accelerometer 119 coupled with a processor 121. Processor 121 may be, for example, be a central processing unit (CPU) of computer system 100, a dedicated processor for controlling the transition between modes of input, etc. As shown in the figures, processor 121 is located in housing 101. However, processor 121 may be located elsewhere, for example, in an external housing, and the processor may be coupled with accelerometer 119 via any of a number of types of communication channels including wired and wireless.

FIG. 1 shows the computer system 100 oriented for a keyboard/mouse input mode. That is, in this particular example embodiment, when display 103 is oriented relatively upright, high, and further away from the user, a keyboard/mouse input mode is selected.

FIG. 2 shows computer system 100 oriented for a touch-based input mode. FIG. 2 shows display 103 oriented relatively flat, low, and closer to the user, in comparison to FIG. 1. In this particular example embodiment shown in FIG. 2, housing 101 has been pulled toward the user and pushed down flat, such that display 103 is now oriented for a touch input mode.

The change in the orientation of display 103 can be detected by accelerometer 119. Specifically, accelerometer 119 measures the force of gravity along an axis (shown by arrowed lines in FIGS. 1 and 2), and periodically sends measurement signals to processor 121. When display 103 is oriented as shown in FIG. 1, the axis of accelerometer 119 is nearly parallel to the direction of gravity. Therefore, accelerometer 119 measures nearly the full force of gravity when display 103 is in the upright orientation of FIG. 1. When display 103 is oriented as shown in FIG. 2, the axis of accelerometer 119 is nearly perpendicular to the direction of gravity. Therefore, accelerometer 119 measures very little, if any, of the force of gravity in the flat orientation of FIG. 2.

Processor 121 can receive the measurement signals from accelerometer 119 and determine the orientation of display 103 based on the measured force of gravity. If the measured force of gravity is below a predetermined threshold, processor 121 can determine that display 103 is oriented for a touch input mode. On the other hand, if the measured force of gravity is above the predetermined threshold, processor 121 can determine that display 103 is oriented for a keyboard/mouse input mode. The predetermined threshold may be customizable by the user. For example, a user may be able to select a threshold vertical angle (tilt) of display 103, which would correspond to a particular force measurement of accelerometer 119. In this case, for example, if a user selected a threshold angle of 60°, processor 121 can select a keyboard/mouse input mode when display 103 is oriented in the range of 90° (i.e., completely upright/vertical) to 60° (i.e., 60° between a plane of the ground and a plane of the display). Processor 121 can select a touch input mode when display 103 is oriented in the range of 60° to 0° (i.e., 0° between the plane of the ground and the plane of the display).

When processor 121 determines (based on the measured force of gravity) that angle of display 103 has crossed the predetermined threshold, i.e., the orientation of display 103 has changed from a touch input mode to a keyboard/mouse input mode, or vice versa, the processor can activate a transition process, such as the example transition process described below with respect to FIGS. 6 to 8.

Figure 3:
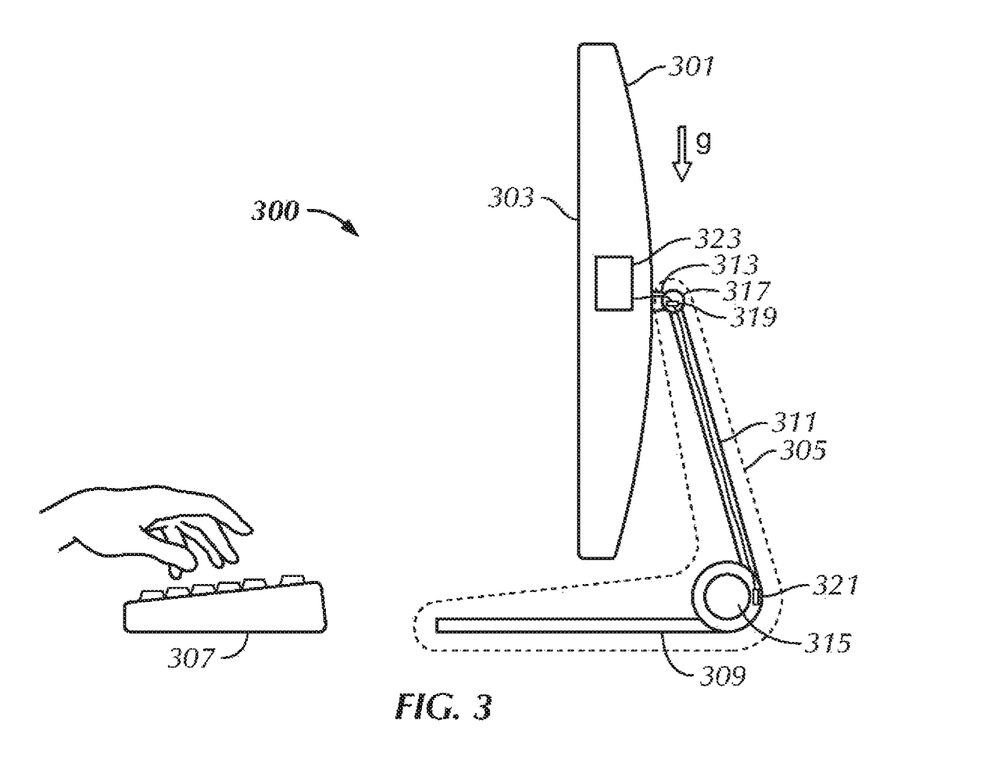
FIG. 3 illustrates another example system for transitioning between a high-resolution input mode and a low-resolution input mode according to embodiments of the invention, the system shown oriented for the high-resolution input mode.
Figure 4:
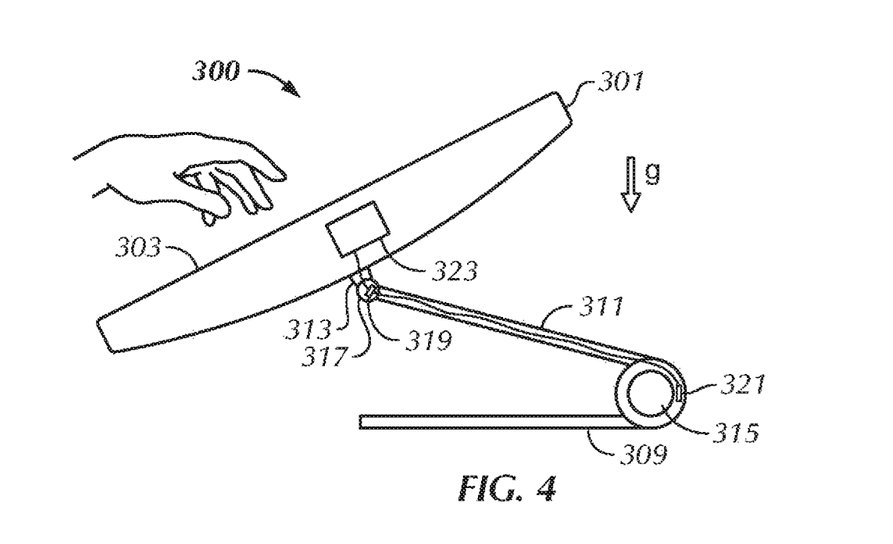
FIG. 4 illustrates the example system of FIG. 3, the system shown oriented for the low-resolution input mode.

Another example system for transitioning between a high-resolution input mode and a low-resolution input mode according to embodiments of the invention will now be described with reference to FIGS. 3 and 4. Similar to the example system shown in FIGS. 1 and 2, FIGS. 3 and 4 show a computer system 300 including a housing 301, display screen 303, an adjustable stand 305, and a keyboard 307. Adjustable stand 305 includes a lower base 309, an arm 311, an attachment post 313, a base hinge 315, and a post hinge 317. Unlike the previous example system, the system of FIGS. 3 and 4 includes an upper rotation sensor 319 at post hinge 317 and a lower rotation sensor 321 at base hinge 315. Upper rotation sensor 319 measures a rotation position of post hinge 317, and lower rotation sensor 321 measures a rotation position of base hinge 315. Rotation sensors 319 and 321 may be, for example, mechanical sensors, electromagnetic sensors, piezoelectric sensors, etc. Rotation sensors 319 and 321 can be coupled with a processor 323, which is located in housing 301.

FIG. 3 shows the computer system 300 oriented for a keyboard/mouse input mode. That is, similar to the previous example embodiment, when display 303 is oriented relatively upright, high, and further away from the user, a keyboard/mouse input mode is selected.

FIG. 4 shows computer system 300 oriented for a touch-based input mode. Similar to the previous example embodiment, FIG. 4 shows display 303 oriented relatively flat, low, and closer to the user, in comparison to the orientation shown in FIG. 3, that is, housing 301 has been pulled toward the user and pushed down flat, such that display 303 is now oriented for a touch input mode.

The change in the orientation of display 303 can be detected by processor 323 based on angle measurements received from rotation sensors 319 and 321. Specifically, lower rotation sensor 319 measures the angle between arm 311 and attachment post 313, and periodically sends measurement signals to processor 323. Upper rotation sensor 321 measures the angle between lower base 309 and arm 311, and periodically sends measurement signals to processor 323. When display 303 is oriented upright as shown in FIG. 3, the angle between arm 311 and attachment post 313 is approximately 90°, and the angle between lower base 309 and arm 311 is also approximately 90°. When display 303 is oriented as shown in FIG. 2, the angle between arm 311 and attachment post 313 is approximately 270°, and the angle between lower base 309 and arm 311 is approximately 30°.

Processor 323 can receive the measurement signals from rotation sensors 319 and 321, and determine the orientation of display 303 relative to a plane of lower base 309 based on the measured angles. If the measured angles indicate that the orientation of display 303 is below a predetermined threshold (for example, if the angle between a plane of display 303 and the plane of lower base 309 is less than 60°), processor 323 can determine that display 303 is oriented for a touch input mode. On the other hand, if the measured angle is above the predetermined threshold (for example, if the angle between the plane of display 303 and the plane of lower base 309 is less than 60°), processor 323 can determine that display 303 is oriented for a keyboard/mouse input mode. Similar to the previous example embodiment, the predetermined threshold may be customizable by the user.

When processor 323 determines that the orientation of display 303 has crossed the predetermined threshold, i.e., the orientation of display 303 has changed from a touch input mode to a keyboard/mouse input mode, or vice versa, the processor can activate a transition process, such as the example transition process described below with respect to FIGS. 6 to 8.

Figure 5:
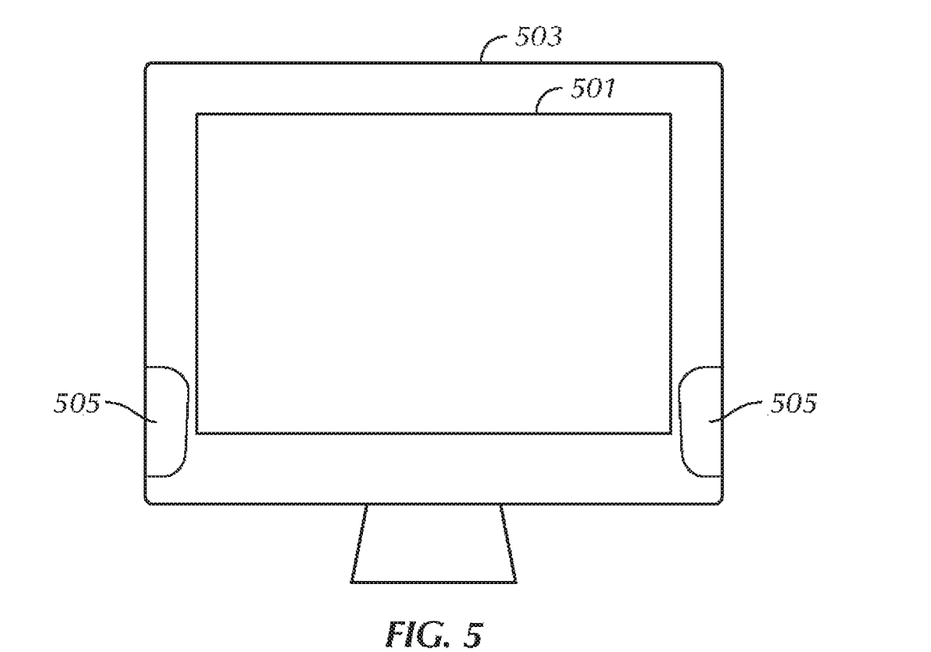
FIG. 5 illustrates yet another example system for transitioning between a high-resolution input mode and a low-resolution input mode according to embodiments of the invention.

FIG. 5 illustrates an example feature to help detect a change in display orientation between a high-resolution input mode and a low-resolution input mode according to embodiments of the invention. FIG. 5 shows a display screen 501 in a housing 503. Housing 503 includes touch sensor areas 505 that detect touch. Touch sensor areas 505 can, for example, be wrapped around to the back of housing 503 (not shown). When a user wishes to change the orientation of display screen 501, the user will typically grab housing 503 at touch sensor areas 505. When the user grabs touch sensor areas 505, the touch sensor areas send touch detection signals to a processor (not shown). The touch detection signals can be used in addition to other orientation sensor signals, such as described above, to help detect that the user has changed the orientation of display 501.

For example, as shown in FIG. 5, display 501 is in a relatively upright orientation, which might be a default orientation known by the processor. When the processor receives touch detection signals from sensor areas 505 followed by a change in orientation information received from other sensors, the processor may be better able to determine that the user has caused a change in the orientation of display 501. A number of factors might be used by the processor in determining that orientation is changed, for example, whether both touch sensor areas 505 are grabbed, whether the detected grab or grabs last for a predetermined period of time, whether the detected grab or grabs are whole-handed grabs, i.e., most if not all of the user's hand contacts the touch sensor area, and other factors.

In other embodiments, a system for transitioning between a high-resolution input mode and a low-resolution input mode could include, for example, any combination of the foregoing example systems. For example, one embodiment could utilize an accelerometer in combination with rotation sensors at two hinges of an adjustable stand. Another embodiment could utilize an accelerometer in combination with a single one rotation sensor. Yet another embodiment could utilize a combination of rotation sensors and touch sensor areas. Furthermore, the invention is not limited to the use of particular sensors, types of sensors, sensor locations or placements, etc. In view of the present description, one skilled in the art will readily recognize that many different types of sensors could be utilized in many different configurations and combinations to detect the orientation of a display screen according to embodiments of the invention.

As described above, when a change between a high-resolution input orientation and a low-resolution input orientation is detected, a process to transition between a UI of the high-resolution input mode and a UI of the low-resolution input mode is performed. FIGS. 6, 7 and 8 illustrate an example method of transitioning between a low-resolution input mode UI, for example, a touch input mode UI, and a high-resolution input mode UI, for example, a mouse/keyboard input mode UI. FIG. 6 shows an example high-resolution input mode UI 600, which is displayed on a display screen 601, that uses mouse/keyboard input. UI 600 includes a menu bar 603 having menu bar items 605, drop-down list items 606, a dock 607 having dock items 609, an application window 611 for a photo-editing software application having directory items 613, scrollbars 615, thumbnail images 617, buttons 618, and a mouse pointer 619. Using high-resolution input devices, such as a mouse, a user interacts with high-resolution input mode UI 600 to select, manipulate, edit, etc., objects displayed on display screen 601. For example, in a typical photo-editing application, such as the one displayed in application window 611, the photos are the objects being selected, edited, etc. To manipulate a photo in a mouse-driven input mode, for example, the user typically selects the photo by moving the mouse pointer over the photo and clicking a mouse button, moves the mouse pointer over a menu bar, selects a menu bar item to display a drop-down list of items corresponding to available functions (e.g., darken/lighten, crop, zoom, etc.), and uses the mouse pointer to select an item from the list to apply the corresponding function to the photo. For example, to zoom-in on a point in a photo image, a user typically selects the image with the mouse pointer, selects the "zoom" item from a drop-down list (which might change the appearance of the mouse pointer to a magnifying glass with a "+"), hovers the mouse over the point in the photo on which the user wishes to zoom-in, and clicks the mouse button multiple times to zoom a desired amount.

In contrast, some low-resolution input mode UIs might allow users to select, manipulate, edit, etc., objects without having to access UI items such as drop-down lists, for example, by touching the object the user wishes to edit and then performing a gesture on the touch screen display. For example, to zoom-in on a particular point in a photo image, a user might touch his or her thumb and index finger to the point and perform a reverse-pincer gesture. The touch-driven interface can identify the touch of the finger and thumb and the motion of the finger and thumb as they are spread apart in the reverse-pincer gesture as an input combination that activates the zoom-in function. Thus, some functions may be performed in touch-driven interfaces without accessing a menu item, button, etc., typically displayed in a high-resolution input mode UI.

On the other hand, some functions performed by some high-resolution input mode UI items might not have a corresponding function in a touch-driven interface. In other words, the functionality of a touch-driven interface might be reduced in comparison to the functionality of mouse/keyboard-driven interface.

In addition, some of the items included in high-resolution UI 600, such as menu bar items 605, drop-down list items 606, scrollbars 615, dock items 609, and directory items 618, might be difficult to select by touching the screen with, for example, a finger or thumb because these objects are relatively small. Consequently, it might be desirable not to include some high-resolution input mode UI items in a low-resolution input mode UI, such as a touch-driven interface.

On the other hand, it might be desirable to include some other items in high-resolution input mode UI 600 in a low-resolution input mode UI, but the items might be too small to be easily selected with touch. For example, buttons 618 might perform functions that have no corresponding gestures in a touch-driven interface.

Figure 6:
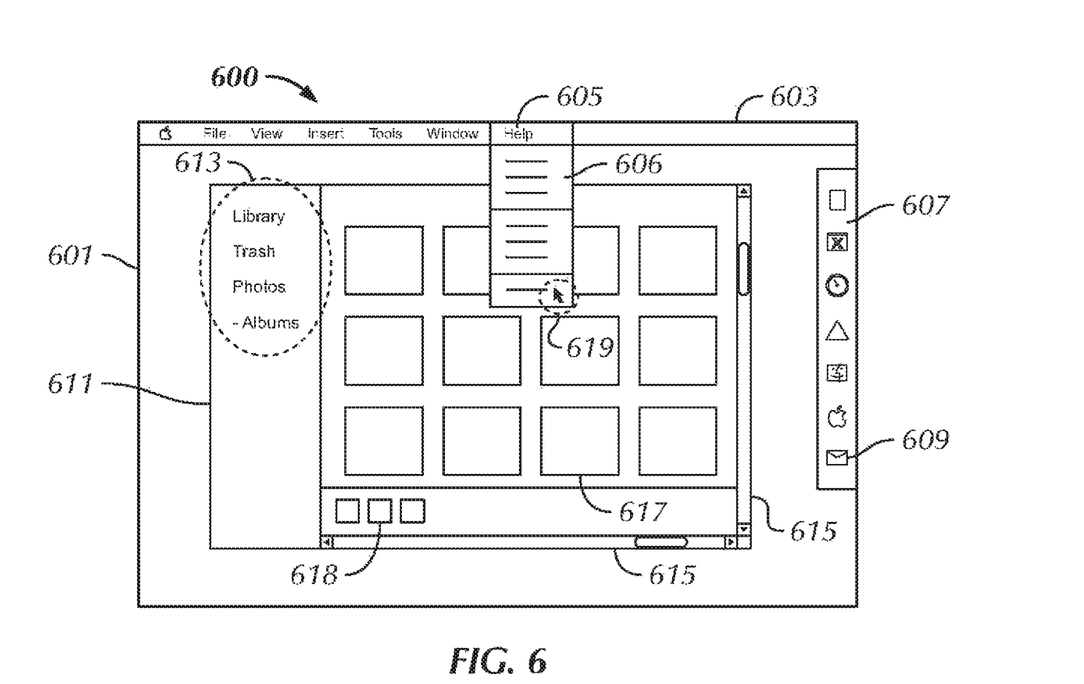
FIGS. 6-8 illustrate an example method for transitioning between a high-resolution input mode and a low-resolution input mode according to embodiments of the invention.
Figure 7:
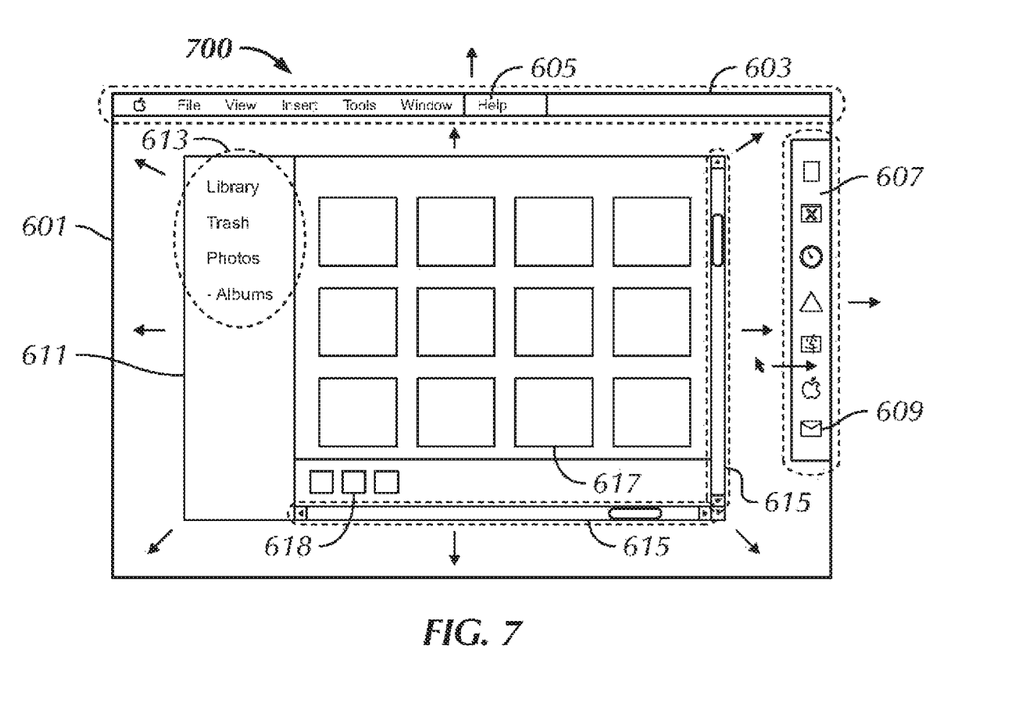

FIG. 7 illustrates one example method of transitioning from high-resolution input mode UI 600 to a low-resolution input mode UI according to embodiments of the invention. FIG. 7 shows a transition effect 700 image in which certain items of UI 600 appear to "slide off" the edges of display screen 601. Specifically, menu bar 603 along with menu bar items 605, dock 607 along with dock items 609, directory items 613, scrollbars 615, and mouse pointer 619 each appear to move towards the closest edge of screen 601, and continue to move off of the screen until they disappear from view. FIG. 7 also shows other items of UI 600 appearing to increase in size. Specifically, transition effect 700 appears to zoom-in on application window 611, thumbnail images 617, and buttons 618.

Figure 8:
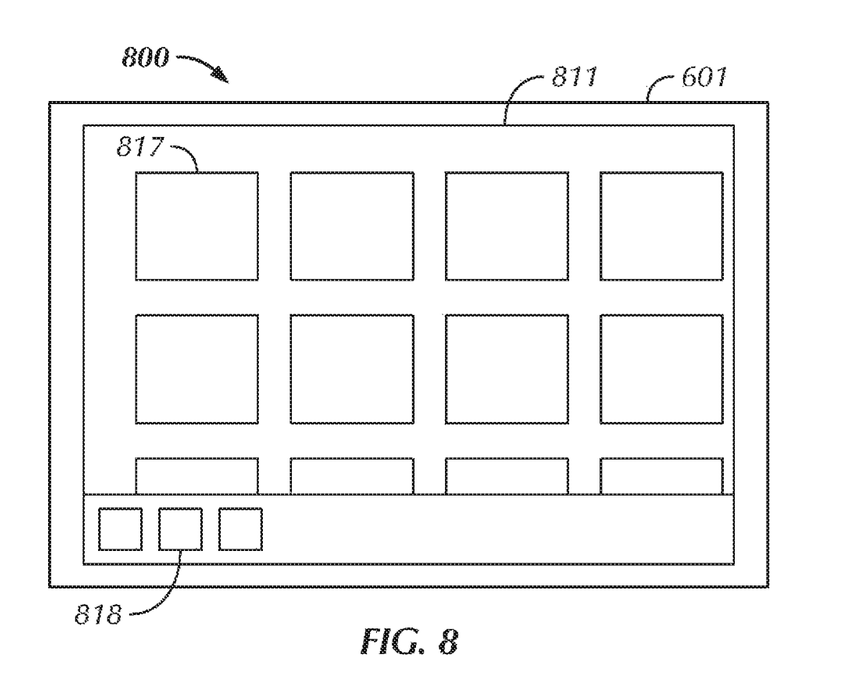

FIG. 8 illustrates an example low-resolution input mode UI 800 that is displayed after transition effect 700 is completed. Menu bar 603, menu bar items 605, dock 607, dock items 609, directory items 613, scrollbars 615, and mouse pointer 619 are no longer visible on display screen 601. UI 800 displays enlarged versions of application window 611 (811), thumbnail images 617 (817), and buttons 618 (818).

As a result of the foregoing example transition method, high-resolution input mode UI items that need not be displayed in a low-resolution input mode UI, for example, items that have corresponding gestures in the touch-driven interface and items that have no corresponding functionality in the touch-driven interface, can be removed from view. This can provide a less cluttered view, and can allow more room on the display, for example, for more important/relevant items to be enlarged for easier touch input.

In order to transition from the low-resolution input mode UI to the high-resolution input mode UI, transition effect 700 can, for example, simply be reversed.

In the example method of transitioning shown in FIGS. 6-8, the process of transitioning between a high-resolution input mode UI and a low-resolution input mode UI is directed to achieve a particular visual effect. In general, the visual effect can be understood by envisioning that the user is viewing the screen through a pinhole. As the display screen is moved towards the user, which would be the typical motion when the user wants to transition from a mouse-based input to a touch-based input, the edges of the pinhole are obscuring the outer portions of the display screen. In other words, items at the outer edge of the screen appear to be moving outward and off the edge of the screen, or being pushed or slid off, so that the view is essentially zooming-in to the center portion of the screen. Once the user is not able to see the menu bar, the dock, the scrollbar, etc., it is likely that the user's natural inclination is to not want to use those items anymore. However, the transition may appear smoother, for example, because the entire view is zoomed-in by the same percentage, and may result in a low-resolution input mode UI that is more similar to the high-resolution input mode UI (and vice versa). Therefore, the transition may be less jarring to the user, and thus, might seem more natural. A more natural, subtle transition might be less disruptive to the user's workflow. In addition, the percentage of zoom applied by transition effect 700 may be customizable by the user.

Figure 9A:
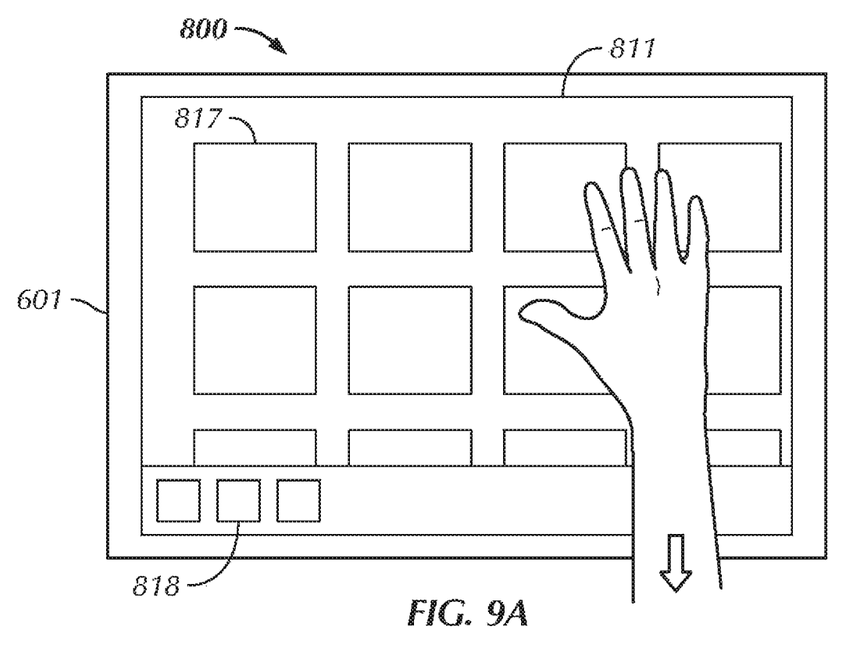
FIGS. 9A-9B illustrate an example method of un-obscuring items that have been obscured according to embodiments of the invention.
Figure 9B:
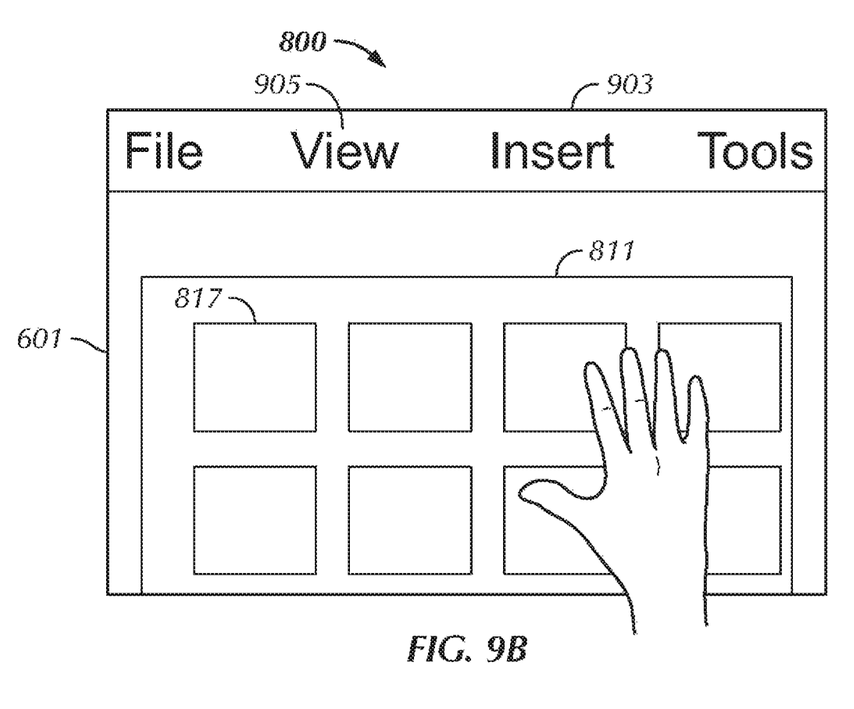

Even though certain items might be obscured by transition effect 700, for example, because they appear to have slid off the screen, a view of these items can be regained (the items are retrievable). FIGS. 9A and 9B show an example method of un-obscuring items that have been slid off the screen according to embodiments of the invention. FIG. 9A shows low-resolution input mode UI 800 displayed on screen 601. If the user would like to view items that have been slid off the screen due to transition effect 700, the user can use a touch input, for example, the user can place his or her hand (or one or more fingers) on the screen and move the hand or fingers in a direction, to un-obscure the items. As shown in FIG. 9A, for example, the user wishes to view menu bar 603, so the user places his or her hand on screen 601 and moved to hand downward to "pull" the menu bar back onto the screen. FIG. 9B shows the result of the pulldown. The items of UI 800, including application window 811, thumbnail images 817, and buttons 818, have moved downward with the user's hand, and enlarged menu bar 603 (903) along with enlarged menu bar items 605 (905) have been pulled down from an offscreen position and are now viewable on screen 601. As shown in FIG. 9B, the user now has access to menu bar items 905, and consequently, may be able to select items from drop-down menus of menu bar 903. This may allow the user to access functions that might not otherwise be accessible in a low-resolution input mode UI.

Because the user can pull the menu bar back onto the screen in a similar manner as it was pushed off the screen, and because the menu bar appears at the same relative location, this gesture can be simple and intuitive for most users. When the user lets go of the screen, i.e., lifts his or her hand from the screen, the menu bar can automatically slide back off the screen as UI 800 returns to the view shown in FIG. 9A.

The ability to un-obscure items can be desirable, particularly since many touch-based applications have fewer menu options and/or other functions than corresponding mouse-based applications, and it may be difficult and/or impractical to create a gesture for every possible function and feature in many of today's software applications. Therefore, compared to a mouse-based input UI for a particular application, a touch-based input UI may have scaled-back functionality, i.e., fewer buttons/selections/features/etc. However, the user may want to see and have access to those menus, scrollbars, etc., while still in a touch-based input mode, especially if the user wants to access a feature/button/menu item in the mouse-based input that is not included in the touch-based input.

In other embodiments, the process of transition effect 700 can be accomplished in other ways. For example, items could be slid off the screen in any direction, at any speed, etc. Portions of certain "obscured" items might remain displayed on the screen, for example, a part of dock 607 along with some dock items 609 could remain on display 601 while the rest of the dock slides off the screen. Items remaining on the screen might be enlarged by the same fixed percentage, by different percentages, and/or some not enlarged at all. The relative positions and/or appearance of some or all of the items remaining on the screen might be changed or modified in ways other than an increase in size.

Figure 10:
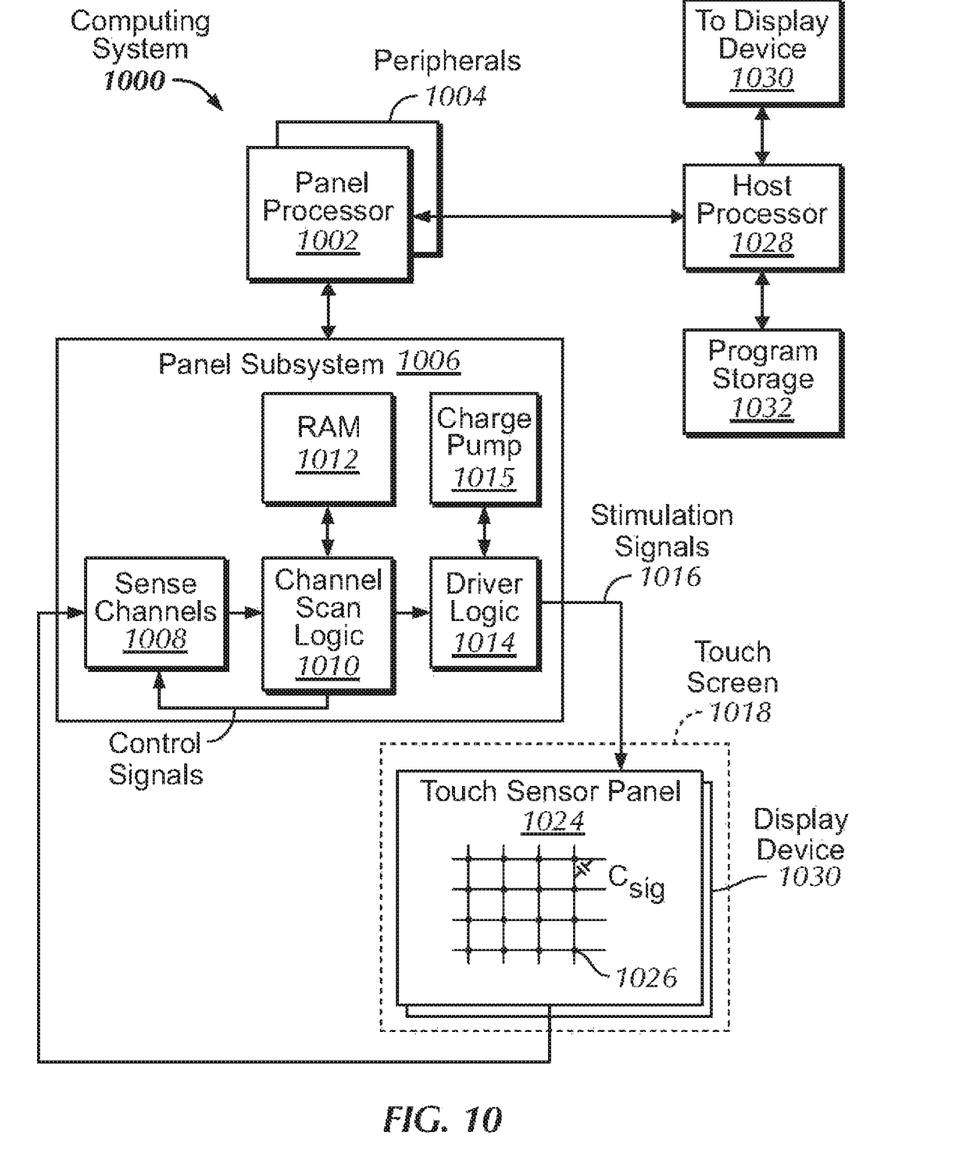
FIG. 10 illustrates an example computing system that can include one or more of the embodiments of the invention.

FIG. 10 illustrates example computing system 1000 that can include one or more of the embodiments of the invention described above. Computing system 1000 can include one or more panel processors 1002 and peripherals 1004, and panel subsystem 1006. Peripherals 1004 can include, but are not limited to, random access memory (RAM) or other types of memory or storage, watchdog timers and the like. Panel subsystem 1006 can include, but is not limited to, one or more sense channels 1008, channel scan logic 1010 and driver logic 1014. Channel scan logic 1010 can access RAM 1012, autonomously read data from the sense channels and provide control for the sense channels. In addition, channel scan logic 1010 can control driver logic 1014 to generate stimulation signals 1016 at various frequencies and phases that can be selectively applied to drive lines of touch sensor panel 1024. In some embodiments, panel subsystem 1006, panel processor 1002 and peripherals 1004 can be integrated into a single application specific integrated circuit (ASIC).

Touch sensor panel 1024 can include a capacitive sensing medium having a plurality of drive lines and a plurality of sense lines, although other sensing media can also be used. Each intersection of drive and sense lines can represent a capacitive sensing node and can be viewed as picture element (pixel) 1026, which can be particularly useful when touch sensor panel 1024 is viewed as capturing an "image" of touch. (In other words, after panel subsystem 1006 has determined whether a touch event has been detected at each touch sensor in the touch sensor panel, the pattern of touch sensors in the multi-touch panel at which a touch event occurred can be viewed as an "image" of touch (e.g. a pattern of fingers touching the panel).) Each sense line of touch sensor panel 1024 can drive sense channel 1008 (also referred to herein as an event detection and demodulation circuit) in panel subsystem 1006.

Computing system 1000 can also include host processor 1028 for receiving outputs from panel processor 1002 and performing actions based on the outputs that can include, but are not limited to, transitioning between a high-resolution input mode and a low-resolution input mode according to one or more embodiments of the invention, moving an object such as a cursor or pointer, scrolling or panning, adjusting control settings, opening a file or document, viewing a menu, making a selection, executing instructions, operating a peripheral device coupled to the host device, answering a telephone call, placing a telephone call, terminating a telephone call, changing the volume or audio settings, storing information related to telephone communications such as addresses, frequently dialed numbers, received calls, missed calls, logging onto a computer or a computer network, permitting authorized individuals access to restricted areas of the computer or computer network, loading a user profile associated with a user's preferred arrangement of the computer desktop, permitting access to web content, launching a particular program, encrypting or decoding a message, and/or the like. Host processor 1028 can also perform additional functions that may not be related to panel processing, and can be coupled to program storage 1032 and display device 1030 such as an LCD display for providing a UI to a user of the device. Display device 1030 together with touch sensor panel 1024, when located partially or entirely under the touch sensor panel, can form touch screen 1018.

Note that one or more of the functions described above can be performed by firmware stored in memory (e.g. one of the peripherals 1004 in FIG. 10) and executed by panel processor 1002, or stored in program storage 1032 and executed by host processor 1028. The firmware can also be stored and/or transported within any computer-readable medium for use by or in connection with an instruction execution system, apparatus, or device, such as a computer-based system, processor-containing system, or other system that can fetch the instructions from the instruction execution system, apparatus, or device and execute the instructions. In the context of this document, a "computer-readable medium" can be any medium that can contain or store the program for use by or in connection with the instruction execution system, apparatus, or device. The computer readable medium can include, but is not limited to, an electronic, magnetic, optical, electromagnetic, infrared, or semiconductor system, apparatus or device, a portable computer diskette (magnetic), a random access memory (RAM) (magnetic), a read-only memory (ROM) (magnetic), an erasable programmable read-only memory (EPROM) (magnetic), a portable optical disc such a CD, CD-R, CD-RW, DVD, DVD-R, or DVD-RW, or flash memory such as compact flash cards, secured digital cards, USB memory devices, memory sticks, and the like.

The firmware can also be propagated within any transport medium for use by or in connection with an instruction execution system, apparatus, or device, such as a computer-based system, processor-containing system, or other system that can fetch the instructions from the instruction execution system, apparatus, or device and execute the instructions. In the context of this document, a "transport medium" can be any medium that can communicate, propagate or transport the program for use by or in connection with the instruction execution system, apparatus, or device. The transport readable medium can include, but is not limited to, an electronic, magnetic, optical, electromagnetic or infrared wired or wireless propagation medium.

Figure 11:
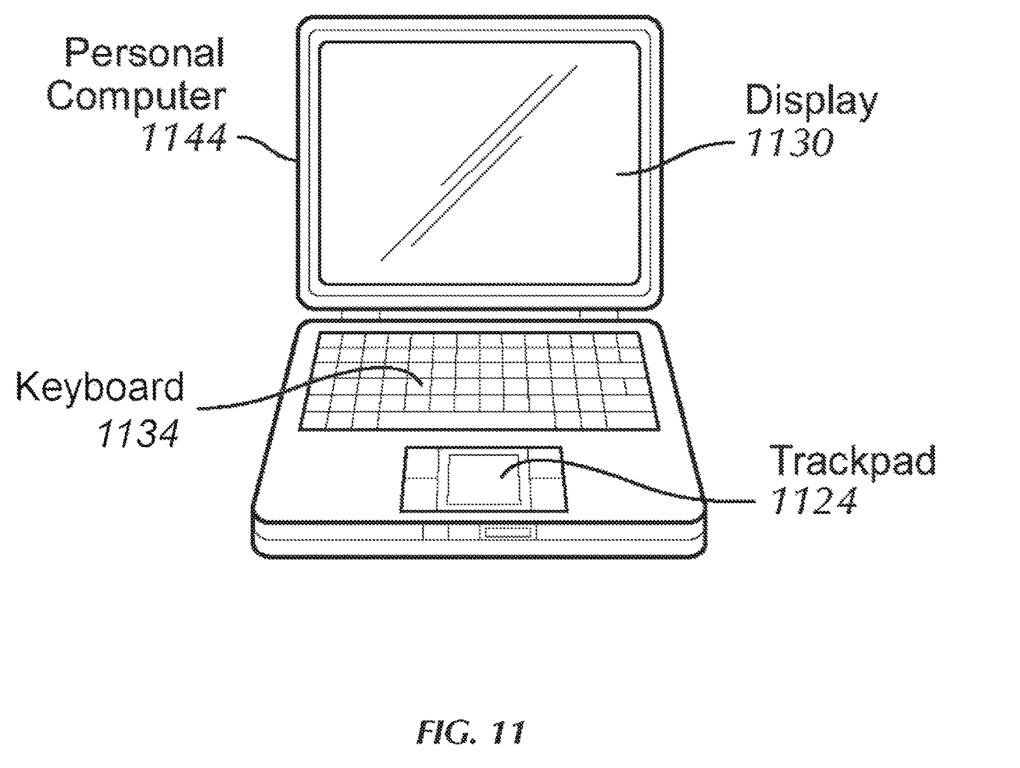
FIG. 11 illustrates an example personal computer that can include one or more embodiments of the invention.

FIG. 11 illustrates an example personal computer 1144 that includes a keyboard 1134, a touch sensor panel (trackpad) 1124, and a touch screen display 1130. Personal computer 1144 includes hardware, software, and/or firmware for transitioning between a user interface for a high-resolution input mode and a user interface for a low-resolution input mode according to embodiments of the invention. For example, personal computer 1144 can be a tablet personal computer, for which the display 1130 can be oriented for keyboard/trackpad input (high-resolution input mode), such as shown in FIG. 11, and the display can also be oriented for touch input (low-resolution input mode, not shown). For example, display 1130 may be rotated and laid flat against keyboard 1134, with the backside of the display facing down against the keyboard so that the display screen faces up, in an orientation for touch input.

Although embodiments of this invention have been fully described with reference to the accompanying drawings, it is to be noted that various changes and modifications will become apparent to those skilled in the art. Such changes and modifications are to be understood as being included within the scope of embodiments of this invention as defined by the appended claims.

What is claimed is:

1. A method for operating an electronic device with a display screen, the method comprising:
    while an angle of the display screen of the electronic device with respect to a lower base of the electronic device is less than a predetermined threshold, displaying a user interface for editing an object displayed on the display screen, wherein the user interface includes a menu bar having one or more menu bar items selectable to edit the object displayed on the display screen;
    while displaying the user interface including the menu bar, determining that the angle of the display screen of the electronic device with respect to the lower base of the electronic device has changed from a first angle that is less than the predetermined threshold to a second angle that is greater than the predetermined threshold; and
    in response to determining that the angle of the display screen with respect to the lower base has changed from the first angle that is less than the predetermined threshold to the second angle that is greater than the predetermined threshold, updating the user interface for editing the object displayed on the display screen to not include the menu bar.

2. The method of claim 1, further comprising:
    while the angle of the display screen of the electronic device with respect to the lower base of the electronic is less than the predetermined threshold, detecting a change in the angle of the display screen with respect to the lower base to a respective angle; and
    in response to detecting the change in the angle of the display screen with respect to the lower base to the respective angle:
        in accordance with a determination that the respective angle is less than the predetermined threshold, maintaining the display of the menu bar in the user interface for editing the object displayed on the display screen.

3. The method of claim 1, wherein:
    while the angle of the display screen of the electronic device with respect to the lower base of the electronic device is greater than the predetermined threshold, the electronic device is configured to edit the object displayed on the display screen in accordance with one or more detected touch gestures.

4. The method of claim 3, wherein:
    while the angle of the display screen of the electronic device with respect to the lower base of the electronic device is less than the predetermined threshold, the electronic device is configured to edit the object displayed on the display screen in accordance with one or more inputs directed to the menu bar, different than the one or more touch gestures.

5. The method of claim 1, wherein:
    while the angle of the display screen of the electronic device with respect to the lower base of the electronic device is less than the predetermined threshold, the user interface includes one or more user interface objects for navigating the user interface, and
    while the angle of the display screen of the electronic device with respect to the lower base of the electronic device is greater than the predetermined threshold, the user interface does not include the one or more user interface objects for navigating the user interface.

6. The method of claim 1, further:
while the angle of the display screen of the electronic device with respect to the lower base of the electronic device is less than the predetermined threshold, the user interface includes a cursor, and
while the angle of the display screen of the electronic device with respect to the lower base of the electronic device is greater than the predetermined threshold, the user interface does not include the cursor.

7. The method of claim 1, wherein updating the user interface for editing the object displayed on the display screen to not include the menu bar includes displaying an animation of the menu bar being removed from the user interface.

8. The method of claim 1, wherein determining that the angle of the display screen of the electronic device with respect to the lower base of the electronic device has changed from being less than the predetermined threshold to being greater than the predetermined threshold is determined based on measurements from a hinge rotation sensor.

9. The method of claim 1, wherein determining that the angle of the display screen of the electronic device with respect to the lower base of the electronic device has changed from being less than the predetermined threshold to being greater than the predetermined threshold is determined based on measurements from an accelerometer.

10. The method of claim 1, wherein the angle of the display screen of the electronic device with respect to the lower base of the electronic device is defined by a hinge between the display screen and the lower base.

11. An electronic device comprising:
one or more processors;
a display screen; and
memory storing instructions, which when executed by the one or more processors, cause the one or more processors to perform a method comprising:
while an angle of the display screen of the electronic device with respect to a lower base of the electronic device is less than a predetermined threshold, displaying a user interface for editing an object displayed on the display screen, wherein the user interface includes a menu bar having one or more menu bar items selectable to edit the object displayed on the display screen;
while displaying the user interface including the menu bar, determining that the angle of the display screen of the electronic device with respect to the lower base of the electronic device has changed from being less than the predetermined threshold to being greater than the predetermined threshold; and
in response to determining that the angle of the display screen with respect to the lower base has changed from being less than the predetermined threshold to being greater than the predetermined threshold, updating the user interface for editing the object displayed on the display screen to not include the menu bar.

12. A non-transitory computer readable storage medium including instructions, which when executed by one or more processors of an electronic device having a display screen, cause the electronic device to perform a method comprising:
while an angle of the display screen of the electronic device with respect to a lower base of the electronic device is less than a predetermined threshold, displaying a user interface for editing an object displayed on the display screen, wherein the user interface includes a menu bar having one or more menu bar items selectable to edit the object displayed on the display screen;
while displaying the user interface including the menu bar, determining that the angle of the display screen of the electronic device with respect to the lower base of the electronic device has changed from being less than the predetermined threshold to being greater than the predetermined threshold; and
in response to determining that the angle of the display screen with respect to the lower base has changed from being less than the predetermined threshold to being greater than the predetermined threshold, updating the user interface for editing the object displayed on the display screen to not include the menu bar.

13. The electronic device of claim 11, wherein the method further comprises: while the angle of the display screen of the electronic device with respect to the lower base of the electronic is less than the predetermined threshold, detecting a change in the angle of the display screen with respect to the lower base to a respective angle; and
in response to detecting the change in the angle of the display screen with respect to the lower base to the respective angle:
in accordance with a determination that the respective angle is less than the predetermined threshold, maintaining the display of the menu bar in the user interface for editing the object displayed on the display screen.

14. The electronic device of claim 11, wherein:
while the angle of the display screen of the electronic device with respect to the lower base of the electronic device is greater than the predetermined threshold, the electronic device is configured to edit the object displayed on the display screen in accordance with one or more detected touch gestures.

15. The electronic device of claim 14, wherein:
while the angle of the display screen of the electronic device with respect to the lower base of the electronic device is less than the predetermined threshold, the electronic device is configured to edit the object displayed on the display screen in accordance with one or more inputs directed to the menu bar, different than the one or more touch gestures.

16. The electronic device of claim 11, wherein:
while the angle of the display screen of the electronic device with respect to the lower base of the electronic device is less than the predetermined threshold, the user interface includes one or
more user interface objects for navigating the user interface, and while the angle of the display screen of the electronic device with respect to the lower base of the electronic device is greater than the predetermined threshold, the user interface does not include the one or more user interface objects for navigating the user interface.

17. The electronic device of claim 11, further:
while the angle of the display screen of the electronic device with respect to the lower base of the electronic device is less than the predetermined threshold, the user interface includes a cursor, and
while the angle of the display screen of the electronic device with respect to the lower base of the electronic device is greater than the predetermined threshold, the user interface does not include the cursor.

18. The electronic device of claim 11, wherein updating the user interface for editing the object displayed on the display screen to not include the menu bar includes displaying an animation of the menu bar being removed from the user interface.

19. The electronic device of claim 11, wherein determining that the angle of the display screen of the electronic device with respect to the lower base of the electronic device has changed from being less than the predetermined threshold to being greater than the predetermined threshold is determined based on measurements from a hinge rotation sensor.

20. The electronic device of claim 11, wherein determining that the angle of the display screen of the electronic device with respect to the lower base of the electronic device has changed from being less than the predetermined threshold to being greater than the predetermined threshold is determined based on measurements from an accelerometer.

21. The electronic device of claim 11, wherein the angle of the display screen of the electronic device with respect to the lower base of the electronic device is defined by a hinge between the display screen and the lower base.

22. The non-transitory computer readable storage medium of claim 12, wherein the method further comprises:
   while the angle of the display screen of the electronic device with respect to the lower base of the electronic is less than the predetermined threshold, detecting a change in the angle of the display screen with respect to the lower base to a respective angle; and
   in response to detecting the change in the angle of the display screen with respect to the lower base to the respective angle:
      in accordance with a determination that the respective angle is less than the predetermined threshold, maintaining the display of the menu bar in the user interface for editing the object displayed on the display screen.

23. The non-transitory computer readable storage medium of claim 12, wherein:
   while the angle of the display screen of the electronic device with respect to the lower base of the electronic device is greater than the predetermined threshold, the electronic device is configured to edit the object displayed on the display screen in accordance with one or more detected touch gestures.

24. The non-transitory computer readable storage medium of claim 23, wherein:
   while the angle of the display screen of the electronic device with respect to the lower base of the electronic device is less than the predetermined threshold, the electronic device is configured to edit the object displayed on the display screen in accordance with one or more inputs directed to the menu bar, different than the one or more touch gestures.

25. The non-transitory computer readable storage medium of claim 12, wherein: while the angle of the display screen of the electronic device with respect to the lower base of the electronic device is less than the predetermined threshold, the user interface includes one or more user interface objects for navigating the user interface, and
   while the angle of the display screen of the electronic device with respect to the lower base of the electronic device is greater than the predetermined threshold, the user interface does not include the one or more user interface objects for navigating the user interface.

26. The non-transitory computer readable storage medium of claim 12, further:
   while the angle of the display screen of the electronic device with respect to the lower base of the electronic device is less than the predetermined threshold, the user interface includes a cursor, and
   while the angle of the display screen of the electronic device with respect to the lower base of the electronic device is greater than the predetermined threshold, the user interface does not include the cursor.

27. The non-transitory computer readable storage medium of claim 12, wherein updating the user interface for editing the object displayed on the display screen to not include the menu bar includes displaying an animation of the menu bar being removed from the user interface.

28. The non-transitory computer readable storage medium of claim 12, wherein determining that the angle of the display screen of the electronic device with respect to the lower base of the electronic device has changed from being less than the predetermined threshold to being greater than the predetermined threshold is determined based on measurements from a hinge rotation sensor.

29. The non-transitory computer readable storage medium of claim 12, wherein determining that the angle of the display screen of the electronic device with respect to the lower base of the electronic device has changed from being less than the predetermined threshold to being greater than the predetermined threshold is determined based on measurements from an accelerometer.

30. The non-transitory computer readable storage medium of claim 12, wherein the angle of the display screen of the electronic device with respect to the lower base of the electronic device is defined by a hinge between the display screen and the lower base.

* * * * *